April 11, 1939.  C. H. SCHURR  2,154,054
GENERATING, CURVED SURFACES
Filed Aug. 27, 1931
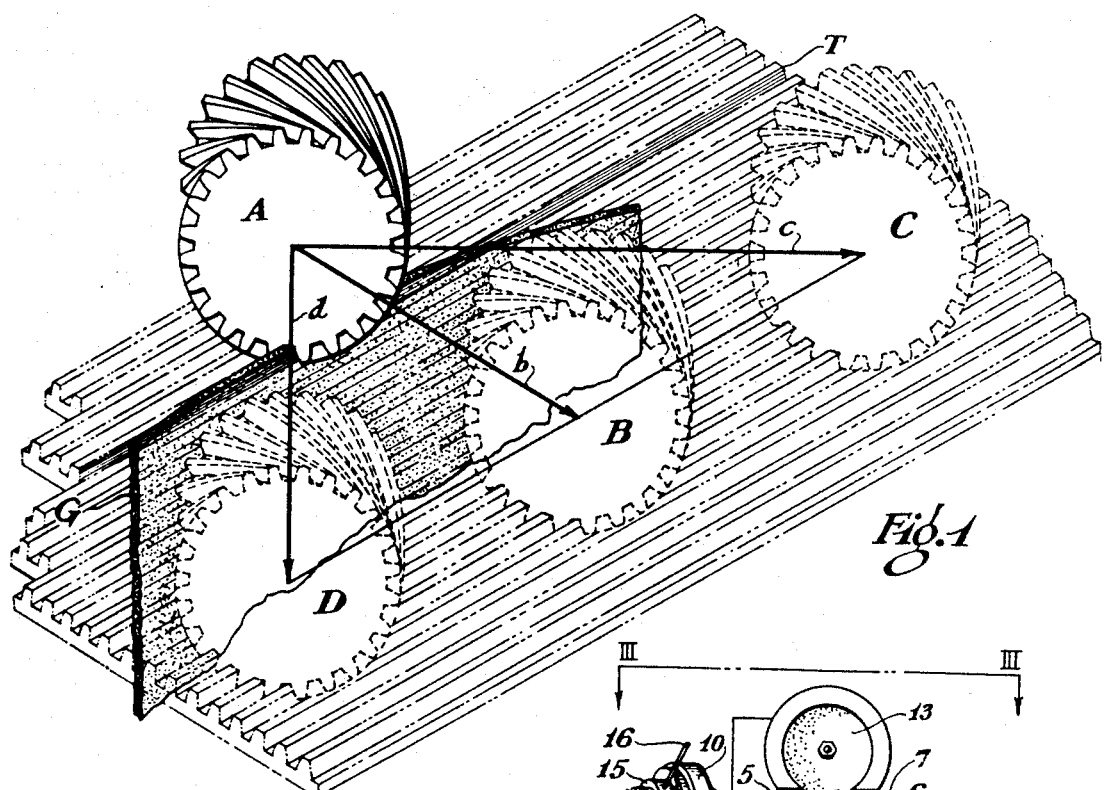
Fig.1
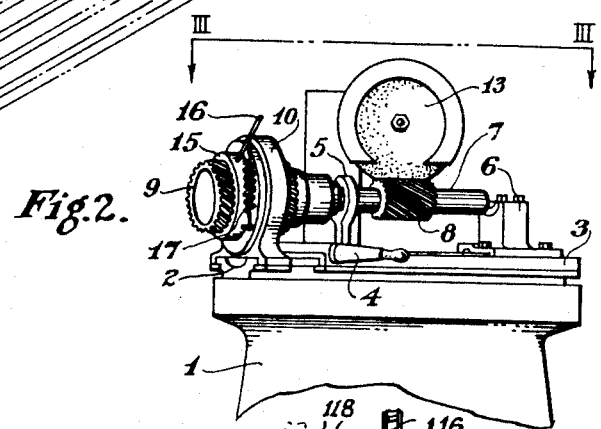
Fig.2.
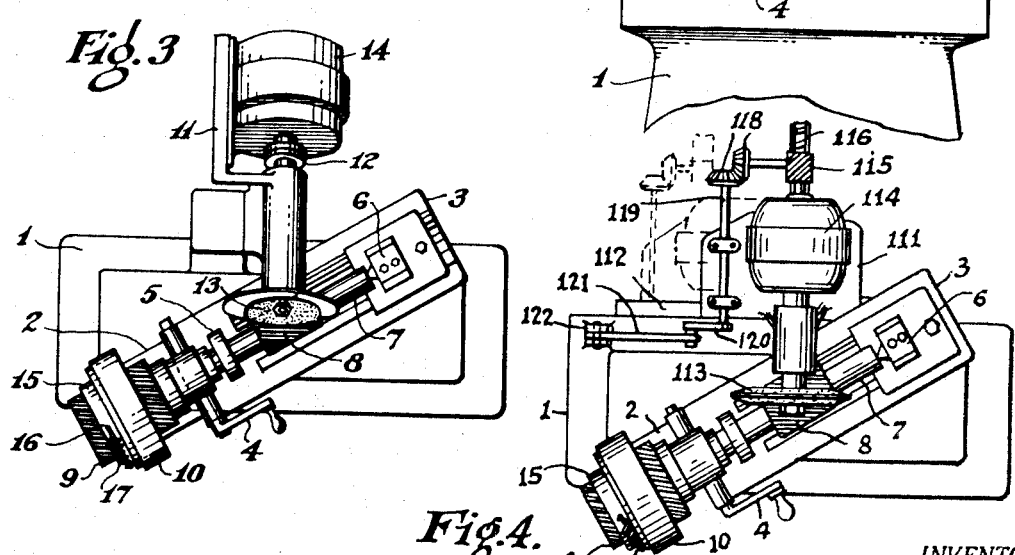
Fig.3
Fig.4.
INVENTOR.
Charles H. Schurr
BY
Hawgood and Van Horn
ATTORNEYS.

Patented Apr. 11, 1939

2,154,054

UNITED STATES PATENT OFFICE 2,154,054

GENERATING CURVED SURFACES

Charles H. Schurr, Cleveland, Ohio, assignor to The Lees-Bradner Company, Cleveland, Ohio, a corporation of Ohio Application August 27, 1931, Serial No. 559,722

6 Claims. (Cl. 51—278)

This invention relates to the generation of curved surfaces and is particularly applicable to the production of involute surfaces upon the helical teeth of gears.

In producing spur gears having involute teeth, a gear blank has been simultaneously translated and rotated, so that the motion of a tooth being operated upon is identical with what it would be if the blank were rolled, on its pitch circle without slippage, upon a plane surface, the blank being thus rolled past a flat-faced cutting tool, such as a grinding wheel. The rolling of the tooth upon the cutting surface develops a true involute curve. The position of the cutting surface, to properly generate this curve, must be in a plane coinciding with a face of a tooth of an imaginary rack with which the gear would mesh. When the tooth face of the imaginary rack meshes with the gear at a given pressure angle, the pitch circle upon which the blank rolls is that upon which it would roll in engagement with the rack. If the pressure angle be reduced to zero, obviously the pitch circle becomes the base circle of the gear.

Obviously, with the spur gear rolling upon a rack, the teeth of the rack are parallel to the axis of the gear and the tooth of the gear contacts the tooth of the rack along a straight line which is also parallel to its axis and extends from end to end of the teeth. If, however, a helical gear be considered in mesh with a rack, it will be obvious that the contact of any tooth of the gear with a tooth of the rack will no longer be parallel to its axis, but will be a line lying in the plane surface of the rack tooth, and inclined from root to crest.

If the helical gear be considered as meshing with a rack of considerable extent in all directions, it will be seen that it can be rolled upon the rack in a direction normal to the teeth of the rack without any slippage along these teeth in the direction of their edges, and that having rotated through a given angular displacement, it will have traversed a given number of teeth of the rack.

It will also be seen that the gear may be rolled in a direction normal to its axis through the same angular displacement and will have traversed the same number of teeth, each tooth of the gear rolling upon a corresponding tooth of the rack in precisely the same manner, except that the tooth will have been slid slightly along the tooth of the rack. Similarly, the gear may be translated along its axis while rotating in mesh with the teeth of the rack, and again the same angular displacement will cause it to traverse the same number of teeth of the rack, rolling upon each in turn with some slippage along their surfaces.

It is, therefore, possible, by providing a tool having a flat surface lying in the plane of the side of one of the rack teeth, and by rolling the gear with any of the three motions above described over said surface, to generate upon the gear an accurate true involute helical tooth surface.

It is an object of the present invention to provide an improved method and mechanism to generatively produce involute helical tooth surfaces.

Other objects will hereinafter appear.

The invention will be better understood from the description of two practical embodiments thereof illustrated in the accompanying drawing, in which;

Figure 1 is a somewhat diagrammatic view of a work gear, an imaginary rack with which the finished gear to be produced would mesh, and a portion of a grinding wheel having a flat face coinciding with one side of one tooth of the rack;

Figure 2 is a front elevation of a machine for grinding helical tooth surfaces;

Figure 3 is a plan view of the machine in Figure 2; and

Figure 4 is a view similar to the view of Figure 3 showing a modified embodiment of the invention.

In Figure 1 a series of rack teeth are indicated by dot-and-dash lines. At A is shown a work gear in the position which it would occupy at the beginning of a generative cutting operation. As stated above, the work gear A may roll along the teeth T of the rack without sliding thereon in a direction normal to the edges of these teeth, its center at the end shown in the drawing following the arrow b, so that the gear moves into the position illustrated at B and in so rolling the flat faces of the teeth T of the rack will generate upon the gear teeth true involute helical surfaces. If a grinding wheel G or other cutting tool having a plane cutting surface is positioned with this surface coincident that of one of the rack teeth T, it will cut the tooth of the gear engaging it into the accurate involute helical profile desired.

One form of apparatus for so moving the work gear in a direction oblique to its axis but normal to the edges of the teeth of the rack with which it would mesh, and the method by which this operation is carried out, are disclosed in the pending application of E. J. Lees, Serial Number 500,692, filed December 8, 1930, now Patent No. 2,025,688, dated December 24, 1935.

If, however, the work gear is rolled from the position shown at A in a radial direction, it will travel along the arrow c to the position shown at C in which it will have traversed exactly the same number of teeth as in rolling along b, but will have moved along the teeth in the direction of their edges by the distance between positions B and C.

In rolling over the flat surface of the grinding wheel G, exactly the same curved surface will have been cut upon the tooth. One manner in which this type of generating process may be carried on is disclosed in my prior Patent No. 1,751,104, issued March 18, 1930.

Considering now the third direction of motion above referred to, that is along the axis of the work gear, this gear may move along the arrow d to the position shown at D in which it will again have turned the same extent and traversed the same number of teeth as in moving along arrows b or c, but this time the teeth will have slid along the teeth of the rack an aggregate distance equal to that between positions D and B.

In each of the three cases described, the components of the motion of the blank are identical excepting the component in a line parallel to the plane of the cutting surface, so that in each case the identical tooth surface is developed.

The mechanism shown in the second and third figures of the drawing is used to move the gear axially as from position A to D past the grinding wheel, and so generate the involute surfaces of the teeth.

The mechanism shown consists of a base 1 on the top of which are ways 2, and slidable upon these ways is a carriage 3 which may be reciprocated by means of a handle 4 having, ways being adjustably secured to the top of the base whereby they may be angularly adjusted about a vertical axis and secured in a desired position, interiorly of the carriage, a pinion (not shown) meshing with a rack rigidly attached to the ways 2. Carried by the carriage are bearings 5 and 6 by which are supported an arbor 7, to which is secured the work gear 8.

The outer end of the arbor is provided with a cylindrical portion or drum 9 having one or more helical grooves or lands formed on its exterior, and these in turn are threaded through complementary lands or grooves formed in a bearing 10 fixed upon the top of the base, so that as the carriage is reciprocated the spindle and work gear will be rotated. The lead of the grooves or lands of cylindrical member 9 must be the same as that of the work gear, but obviously the diameters may differ.

Carried by the base is an upwardly extending arm or bracket 11 on which is journalled a shaft 12 carrying at one end a grinding wheel 13 and driven by a motor 14. The bracket or arm is adjustably secured to the base in any desired manner so that it may be angularly adjusted about a generally horizontal axis. The grinding wheel is adjusted so that its flat surface is coincident with a tooth of a rack which would mesh with the work gear, and hence when the slide is reciprocated will generate a true involute helical tooth surface thereon.

A ring 15 is carried adjacent bearing 10 and is provided with an internal groove or grooves to receive the lands on drum 9. This ring serves a dual function. When the carriage is moved to the extreme left, from the position shown in Figure 2, the lands of part 9 have passed beyond bearing 10, and the operator can rotate ring 15 by means of a handle 16 by a distance equal to one or more teeth, thus indexing the work gear. When the carriage is returned to the right, a fresh surface will be operated upon by the grinding wheel. A spring 17 connects handle 16 to bearing 10, and, while the drum is engaging both bearing and ring, holds the lands of drum 9 tightly against one side of the grooves in bearing 10, taking up any slack which may exist between these two, and greatly improving the accuracy of the work produced.

As the plane surface of the grinding wheel 13 conforms to the side of a rack tooth, it will be obvious that the spindle 12 lies in a vertical plane normal to the tooth being operated upon, and that the grinding face is disposed, with relation to the horizontal when the parts are disposed as shown, at the pressure angle of the gear being ground.

It will also be obvious that a grinding wheel 113 having two conical faces might be used instead of one having a single flat face in which event, however, it will be necessary to reciprocate the grinding wheel horizontally in a direction perpendicular to its axis, so that the elements of the conical faces will traverse two planes corresponding to the opposite sides of a single rack tooth, and it will also be obvious that a plurality of grinding wheels may be simultaneously used at different points about the periphery of the work gear. In this form, a more or less diagrammatic means for reciprocating the wheel has been illustrated, this consisting of a bracket 111, reciprocable on ways 112 formed on the rear base 1, the bracket carrying the motor 114 which drives the grinding wheel 113. The motor also drives the worm 115, in mesh with worm wheel 116, which, through bevelled gears 118, rotates a shaft 119 having on its end a crank 120. The crank is connected by a connecting rod 121 to bosses 122 on the top of base 1, so that, as the crank is rotated by the motor 114 at a much slower rate than the grinding wheel, the bracket 111 is reciprocated transversely as indicated in Figure 4 in a direction normal to the axis of the spindle carrying the grinding wheel 113.

The motion above described may also be used to advantage in lapping the faces of gear teeth, and in so doing, a rack may very conveniently be used as the lap. The rack may extend parallel to the axis of the work spindle and should be long enough so that each tooth of the work gear will be lapped over its entire surface when the spindle is reciprocated the full length of its stroke. Alternatively, the rack may extend laterally and the work gear reciprocated back and forth a sufficient distance to lap one tooth, the gear being rolled across the lap to bring the successive teeth into engagement therewith, which operation may be performed simultaneously with the reciprocation or intermittently, or in any other desired manner.

While I have described the illustrated embodiment of my invention in some particularity, obviously many others will readily occur to those skilled in the art to which this appertains, and I therefore do not limit myself to the precise details shown and described, but claim as my invention all embodiments, variations and modifications coming within the scope of the appended claims.

I claim:

1. A machine tool comprising a base, a carriage slidable thereon, means for reciprocating the carriage, bearings upon the carriage, a work spindle rotatably mounted in said bearings and having its axis parallel to the direction of motion of the carriage, a drum on said work spindle, a stationary guide through which the drum may slide, helically disposed interengaging projections and recesses between the drum and guide, a ring for similar engagement with the drum, resilient means between the ring and stationary guide, a tool spindle supported by the base, a tool carried by said tool spindle having working surfaces operating in a given plane, and means for rotating the tool spindle.

2. A machine tool comprising a base, a carriage slidable thereon, means for reciprocating the carriage, bearings upon the carriage, a work spindle rotatably mounted in said bearings and having its axis parallel to the direction of motion of the carriage, a drum on said work spindle, a stationary guide through which the drum may slide, helically disposed interengaging projections and recesses between the drum and guide, a ring for similar engagement with the drum, and means for rotating the ring relative the guide when the drum is out of engagement with the guide, a tool spindle supported by the base, and means for rotating the tool spindle.

3. The method of generating helical involute gear faces which comprises mounting a work gear so that it may be translated axially and simultaneously rotated about its axis, positioning a cutting tool having conical faces to bring a part of its surface into coincidence with the tooth of an imaginary rack which would mesh with the gear to be produced from the work gear, translating the work gear along its axis and simultaneously imparting a rotation thereto equivalent to the lead of the work gear, and reciprocating the tool in a direction normal to its axis and parallel to a plane passing through the work gear axis.

4. The method of generating helical involute gear faces which comprises mounting a work gear upon a spindle so that it may be translated axially and simultaneously rotated about its axis, positioning a cutting tool to bring a part of its surface into coincidence with the tooth of an imaginary rack having a pressure angle greater than zero which would mesh with the gear to be produced, translating said spindle and work gear axially, and simultaneously maintaining a point fixed with relation to the tool in coincidence with a helix about the axis of said work gear to impart a rotation to said work gear relative the cutting tool equivalent to the lead of the work gear.

5. A machine tool for a generative production of gears, comprising a base, a tool spindle support mounted thereon and angularly adjustable in one plane relative thereto, a tool upon said tool spindle, the working portions of which are maintained within a given plane corresponding to the side of a rack tooth at a pressure angle greater than zero which would mesh with the gear which is to be produced, a carriage mounted on said base and angularly adjustable in another plane, a work spindle journalled in said carriage, feed means for translating the carriage axially of the work spindle, and means fixed to the work spindle, and means fixed to the base in engagement therewith for rotating the work spindle corresponding to the lead of a helical work gear mounted upon the spindle.

6. A machine tool for the generative production of gears, comprising a work spindle and a tool spindle, said spindles being adjustable relative each other about about two mutually perpendicular axes, means for rotating the tool spindle, a tool carried by the tool spindle having operative portions working in a given plane corresponding to the side of a rack tooth of pressure angle greater than zero which would mesh with a gear which is to be produced, means for translating one of the spindles relative the other in the direction of the axis of the work spindle, and an element fixed to the work spindle, and an interengaging element fixed with respect to the tool spindle for rotating said work spindle about its axis simultaneously with said translation.

CHARLES H. SCHURR.